US009600206B2

(12) United States Patent
Kotagiri et al.

(10) Patent No.: US 9,600,206 B2
(45) Date of Patent: Mar. 21, 2017

(54) REQUEST ORDERING SUPPORT WHEN SWITCHING VIRTUAL DISK REPLICATION LOGS

(75) Inventors: Sriravi Kotagiri, Hyderabad (IN); Rahul Shrikant Newaskar, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 412 days.

(21) Appl. No.: 13/564,449

(22) Filed: Aug. 1, 2012

(65) Prior Publication Data

US 2014/0040572 A1    Feb. 6, 2014

(51) Int. Cl.
*G06F 3/06* (2006.01)
*G06F 11/20* (2006.01)

(52) U.S. Cl.
CPC ............ *G06F 3/0676* (2013.01); *G06F 3/065* (2013.01); *G06F 3/0619* (2013.01); *G06F 3/0664* (2013.01); *G06F 11/2097* (2013.01); *G06F 2201/815* (2013.01); *G06F 2201/82* (2013.01)

(58) Field of Classification Search
CPC .. G06F 3/065; G06F 11/2064; G06F 11/2069; G06F 11/2074; G06F 11/2082; G06F 12/0646; G06F 17/30; G06F 17/30309; G06F 17/30312; G06F 17/30368; G06F 17/30371; G06F 17/30575
USPC ....... 707/999.202, E17.005, E17.007; 711/6, 711/152, 154, 159, 162, 163, E12.001, 711/E12.103
See application file for complete search history.

(56) References Cited

U.S. PATENT DOCUMENTS

| 6,065,018 A | 5/2000 | Beier et al. |
| 6,594,698 B1 | 7/2003 | Chow et al. |
| 6,678,809 B1 | 1/2004 | Delaney et al. |
| 6,711,632 B1 | 3/2004 | Chow et al. |
| 7,174,379 B2 | 2/2007 | Agarwal et al. |

(Continued)

FOREIGN PATENT DOCUMENTS

EP    2309387    4/2011

OTHER PUBLICATIONS

"Application Consistent Snapshot Backups", Retrieved at <<http://www.ca.com/Files/TechnicaiDocuments/arcserve-d2d-app-consistent-snapshot_235095.pdf>>, Retrieved Date: Mar. 24, 2011, 2 Pages.

(Continued)

*Primary Examiner* — Gary Portka
(74) *Attorney, Agent, or Firm* — John Jardine; Dan Choi; Micky Minhas

(57) ABSTRACT

Storage access requests, such as write requests, are received from a virtual machine. A storage request processing module updates one of multiple virtual disks as directed by each of the storage access requests, and a replication management module stores information associated with each storage access request in one of multiple logs. The logs can be transferred to a recovery device at various intervals and/or in response to various events, which results in switching logs so that the replication management module stores the information associated with each storage access request in a new log and the previous (old) log is transferred to the recovery device. During this switching, request ordering for write order dependent requests is maintained at least in part by blocking processing of the information associated with each storage access request.

20 Claims, 7 Drawing Sheets

(56) References Cited

U.S. PATENT DOCUMENTS

| | | | |
|---|---|---|---|
| 7,203,944 | B1 | 4/2007 | Rietschote et al. |
| 7,219,262 | B2 | 5/2007 | Miller et al. |
| 7,257,811 | B2 | 8/2007 | Hunt et al. |
| 7,383,405 | B2 | 6/2008 | Vega et al. |
| 7,484,208 | B1 | 1/2009 | Nelson |
| 7,509,351 | B2 | 3/2009 | Lomet et al. |
| 7,600,087 | B2 * | 10/2009 | Yamagami ............... 711/162 |
| 7,707,372 | B1 | 4/2010 | Kumar et al. |
| 7,716,667 | B2 | 5/2010 | Rietschote et al. |
| 7,761,573 | B2 | 7/2010 | Travostino et al. |
| 7,788,521 | B1 | 8/2010 | Sim-Tang |
| 7,788,665 | B2 | 8/2010 | Oshins |
| 7,890,461 | B2 | 2/2011 | Oeda et al. |
| 7,900,005 | B2 | 3/2011 | Kotsovinos et al. |
| 7,996,484 | B2 | 8/2011 | Mundkur et al. |
| 8,117,410 | B2 | 2/2012 | Lu et al. |
| 8,131,723 | B2 | 3/2012 | Sim-Tang |
| 8,150,971 | B2 | 4/2012 | Lublin et al. |
| 8,234,518 | B2 | 7/2012 | Hansen |
| 8,332,689 | B2 | 12/2012 | Timashev et al. |
| 8,332,848 | B2 | 12/2012 | Azulay et al. |
| 8,335,902 | B1 | 12/2012 | Feathergill |
| 8,359,593 | B2 | 1/2013 | Golosovker et al. |
| 8,370,832 | B2 | 2/2013 | White |
| 8,380,669 | B2 | 2/2013 | Groethe et al. |
| 8,458,284 | B2 | 6/2013 | Huang et al. |
| 8,490,092 | B2 | 7/2013 | Reuther et al. |
| 8,504,686 | B2 | 8/2013 | Phaal |
| 8,548,949 | B2 | 10/2013 | Jennas et al. |
| 8,689,047 | B2 | 4/2014 | Kotagiri et al. |
| 8,712,970 | B1 | 4/2014 | Sim-Tang |
| 8,782,235 | B2 | 7/2014 | Nishiguchi et al. |
| 9,223,607 | B2 | 12/2015 | Kar et al. |
| 2003/0014568 | A1 | 1/2003 | Kishi |
| 2003/0047057 | A1 | 3/2003 | Sasaki |
| 2004/0260726 | A1 * | 12/2004 | Hrle et al. ............... 707/104.1 |
| 2006/0026460 | A1 * | 2/2006 | Goldberg et al. ............ 714/8 |
| 2006/0212668 | A1 * | 9/2006 | Furukawa et al. .......... 711/162 |
| 2007/0156983 | A1 * | 7/2007 | Kern et al. ................ 711/162 |
| 2007/0192765 | A1 | 8/2007 | Shimogawa et al. |
| 2008/0162590 | A1 | 7/2008 | Kundu et al. |
| 2008/0183922 | A1 | 7/2008 | Sampathkumar |
| 2008/0189432 | A1 | 8/2008 | Abali et al. |
| 2009/0249332 | A1 | 10/2009 | Hoehle et al. |
| 2009/0328044 | A1 * | 12/2009 | Bergheaud et al. .......... 718/101 |
| 2010/0050249 | A1 | 2/2010 | Newman |
| 2010/0070725 | A1 | 3/2010 | Prahlad et al. |
| 2010/0071025 | A1 | 3/2010 | Devine et al. |
| 2010/0082922 | A1 | 4/2010 | George et al. |
| 2010/0107158 | A1 | 4/2010 | Chen et al. |
| 2010/0153514 | A1 | 6/2010 | Dabagh et al. |
| 2010/0241726 | A1 | 9/2010 | Wu |
| 2010/0268816 | A1 | 10/2010 | Tarui |
| 2010/0299666 | A1 | 11/2010 | Agbania et al. |
| 2010/0306381 | A1 | 12/2010 | Lublin et al. |
| 2010/0318991 | A1 | 12/2010 | Venkitachalam et al. |
| 2011/0004935 | A1 | 1/2011 | Moffie et al. |
| 2011/0099342 | A1 | 4/2011 | Ozdemir |
| 2011/0116185 | A1 | 5/2011 | Katagiri et al. |
| 2011/0145471 | A1 | 6/2011 | Corry et al. |
| 2011/0197039 | A1 | 8/2011 | Green et al. |
| 2011/0231839 | A1 | 9/2011 | Bennett et al. |
| 2011/0302577 | A1 | 12/2011 | Reuther et al. |
| 2011/0320556 | A1 | 12/2011 | Reuther |
| 2012/0023493 | A1 | 1/2012 | Mori |
| 2012/0109895 | A1 | 5/2012 | Zwilling et al. |
| 2012/0151250 | A1 | 6/2012 | Saika |
| 2012/0174102 | A1 | 7/2012 | Kagan et al. |
| 2013/0024722 | A1 | 1/2013 | Kotagiri et al. |
| 2013/0185719 | A1 | 7/2013 | Kar et al. |
| 2013/0283092 | A1 | 10/2013 | Das et al. |
| 2014/0208012 | A1 | 7/2014 | Kotagiri et al. |
| 2014/0344809 | A1 | 11/2014 | Jin et al. |
| 2016/0085837 | A1 | 3/2016 | Kotagiri et al. |

OTHER PUBLICATIONS

"Citrix XenServer and NetApp Storage Best Practices", Retrieved at <<http://www.citrix.com/site/resources/dynamic/partnerDocs/XSandNetAppstoragebestpractices_7.15.10.pdf>>, (May 2010), 104 Pages.

"Oracle Database High Availability Features and Products", Retrieved at <<http://download.oracle.com/docs/cd/B28359_01/server.111/b28281/hafeatures.htm>>, Retrieved Date: Mar. 24, 2011, 51 Pages.

"Second-generation CDP", Retrieved at <<http://searchstorage.techtarget.com/magPrintFriendly/0,293813,sid5_gci1334530,00.html>>, (Oct. 12, 2008), 6 Pages.

Howard, John S., "Online Backups Using the VxVM Snapshot Facility", Retrieved at <<http://www.sun.com/blueprints/0900/vxvmfac.pdf>>, (Sep. 2000), 7 Pages.

Mohan, et al., "ARIES: a transaction recovery method supporting tine-granularity locking and partial rollbacks using write-ahead logging", Retrieved at <<http://jloxim.mimuw.edu.pl/redmine/projects/jloxim/repository/revisions/2314/raw/trunk/docs/knowledge/log/10.1.1.109.2480-Aries-write-ahead-logging.pdf>>, Proceedings of ACM Transactions on Database Systems, vol. 17, No. 1, Mar. 1992, pp. 94-162.

Narayanan, et al., "Migrating Server Storage to SSDs: Analysis of Tradeoffs", Retrieved at <<http://citeseerx.ist.psu.edu/viewdoc/download?doi=10.1.1.150.2362&rep=rep1&type=pdf>>, Proceedings of the 4th ACM European conference on Computer systems, Apr. 1, 2009, pp. 145-158.

"Virtual Disk Replication Using Log Files", U.S. Appl. No. 13/188,480, filed Jul. 22, 2011, pp. 48.

"Notice of Allowance", U.S. Appl. No. 13/188,480, Nov. 8, 2013, 7 pages.

"Non Final Office Action", U.S. Appl. No. 13/188,480, (Jul. 9, 2013),16 Pages.

"Non-Final Office Action", U.S. Appl. No. 14/221,290, May 11, 2015, 9 pages.

"EMC Recover Point/SE for the CLARiiON CX4", In EMC White Paper, Feb. 2010, 19 pages.

"Final Office Action", U.S. Appl. No. 14/221,290, Sep. 18, 2015, 41 pages.

"Introduction to VMware vSphere Replication", In Technical White Paper, Sep. 15, 2012, 10 pages.

Laverick,"Administering VMware Site Recovery Manager 5.0: Configuring the Protected Site", Available at: http://www.pearsonitcertification.com/articles/article.aspx?p=1828678&seqNum=5, Feb. 28, 2012, 6 pages.

Sharma,"A Practical Guide to Microsoft Hyper-V Replica", Available at: https://www.simple-talk.com/sysadmin/virtualization/a-practical-guide-to-microsoft-hyper-v-replica-part-i/, Jun. 10, 2013, 24 pages.

Shenoy,"Making Microsoft Sync Framework Work with PostgreSql", Available at: http://www.infoq.com/articles/Microsoft-Sync-Framework-PostgreSql, Mar. 18, 2011, 17 pages.

Siebert,"A look at VMware vSphere Replication for Site Recovery Manager 5", Available at: http://searchdisasterrecovery.techtarget.com/tip/A-look-at-VMware-vSphere-Replication-for-Site-Recovery-Manager-5, Sep. 24, 2011, 5 pages.

"Final Office Action", U.S. Appl. No. 13/925,752, Aug. 21, 2015, 7 pages.

"International Search Report and Written Opinion", Application No. PCT/US2012/045774, Jul. 6, 2012, 11 pages.

"International Search Report and Written Opinion", Application No. PCT/US2015/051293, Jan. 20, 2016, 13 pages.

"Migrate a Virtual Machine to a New Host and Datastore by Using vMotion in the vSphere Web Client", 2012, 3 pages.

"Migrating Virtual Machines in the vSphere Client", 2012, 1 page.

"Migration Requirements", PowerVC Standard Edition 1.2.2, Oct. 2014, 2 pages.

"Non-Final Office Action", U.S. Appl. No. 13/925,752, May 7, 2015, 12 pages.

"Notice of Allowance", U.S. Appl. No. 13/177,432, Mar. 6, 2013, 12 pages.

(56) References Cited

OTHER PUBLICATIONS

"Notice of Allowance", U.S. Appl. No. 13/925,752, Mar. 14, 2016, 9 pages.
"Notice of Allowance", U.S. Appl. No. 13/925,752, May 10, 2016, 9 pages.
"Notice of Allowance", U.S. Appl. No. 13/925,752, Dec. 10, 2015, 9 pages.
"Notice of Allowance", U.S. Appl. No. 14/221,290, May 18, 2016, 8 pages.
"Virtual Machine Migration Comparison: VMWare VSphere vs. Microsoft Hyper-V", Oct. 2011, 36 pages.
"Virtual Machine Migration", NSRC, 2014, 26 pages.
"vMotion", Sep. 10, 2015, 6 pages.
Bradford, "Live Wide-Area Migration of Virtual Machines Including Local Persistent State", International Conference on Virtual Execution Environments (Co-Located with FCRC 2007 Conference), Jun. 2007, pp. 169-179.
Clark, "Live Migration of Virtual Machines", In Proceedings NSDI'05 2nd Conference on Symposium on Networked Systems Design & Implementation, vol. 2, 2005, 14 pages.
Li, "HyperMIP: Hypervisor Controlled Mobile IP for Virtual Machine Migration Across Networks", 11th IEEE High Assurance Systems Engineering Symposium, Dec. 2008, pp. 80-88.
Luo, "Live and Incremental Whole-System Migration of Virtual Machines Using Block-Bitmap", IEEE International Conference on Cluster Computing, Sep. 29, 2008, 8 pages.
Travostino, "Seamless Live Migration of Virtual Machines Over the Man/WAN", Future Generation Computer Systems—IGrid 2005, Oct. 2008, 10 pages.
Voorsluys, "Cost of Virtual Machine Live Migration in Clouds: A Performance Evaluation", Science, vol. 5931, 2009, 12 pages.
Watanabe, "A Performance Improvement Method for the Global Live Migration of Virtual Machine with IP Mobility", Proceedings of 5th International Conference on Mobile Computing and Ubiquitous Networking, Apr. 2010, 6 pages.
"Notice of Allowance", U.S. Appl. No. 14/221,290, Feb. 12, 2016, 5 pages.
"Non-Final Office Action", U.S. Appl. No. 14/221,290, Dec. 10, 2015, 5 pages.
"Final Office Action", U.S. Appl. No. 13/351,487, Apr. 23, 2014, 14 pages.
"Final Office Action", U.S. Appl. No. 13/351,487, May 20, 2015, 15 pages.
"International Preliminary Report on Patentability", Application No. PCT/US2015/051293, Jul. 15, 2016, 7 pages.
"Joyce Fee: Oracle8 Administrators Guide Release 8.0", Dec. 1997, 512 pages.
"Non-Final Office Action", U.S. Appl. No. 13/351,487, Jan. 31, 2014, 12 pages.
"Non-Final Office Action", U.S. Appl. No. 13/351,487, Oct. 22, 2014, 14 pages.
"Non-Final Office Action", U.S. Appl. No. 14/495,685, Oct. 19, 2016, 21 pages.
"Notice of Allowance", U.S. Appl. No. 13/351,487, Aug. 28, 2015, 8 pages.
"The Design and Evolution of Live Storage Migration in VMware ESX", retrieved at <hllp://www.usenix.org/events/atc11/techlfinal_files/Mashtizadeh.pdf, Jun. 2011, 14 pages.
Zheng, "Workload-Aware Live Storage Migration for Clouds", Proceedings: 7th ACM SIGPLAN/SIGOPS International Conference on Virtual Executino Environments, Mar. 2011, 12 pages.
"Non-Final Office Action", U.S. Appl. No. 14/221,290, Dec. 29, 2016, 17 pages.

\* cited by examiner

REQUEST ORDERING SUPPORT WHEN SWITCHING VIRTUAL DISK REPLICATION LOGS

BACKGROUND

As computers have become more commonplace, individuals and businesses have become increasingly reliant on reliable computer systems. Recovery mechanisms can be implemented to protect against various malfunctions, such as power failures, hardware and/or software errors, and so forth. The operating system and/or other control programs of a computer can provide various recovery mechanisms. Additional programs running on a computer can also provide their own recovery mechanisms of which the operating system and/or other control programs of the computer are unaware. With different recovery mechanisms operating, it can be difficult to prevent one recovery mechanism from interfering with or otherwise adversely affecting another recovery mechanism. Such interference or adverse effect can result in one or more recovery mechanisms operating incorrectly, which can result in the desired protection not being provided.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, storage access requests are received from a virtual machine in a system. In the system, the storage access requests are received by both a storage request processing module that updates one of multiple virtual disks as directed by each of the storage access requests, and a replication management module that stores information associated with each storage access request in one of multiple logs. When switching the multiple logs, request ordering for write order dependent requests is maintained.

BRIEF DESCRIPTION OF THE DRAWINGS

The same numbers are used throughout the drawings to reference like features.

DETAILED DESCRIPTION

Figure 1:
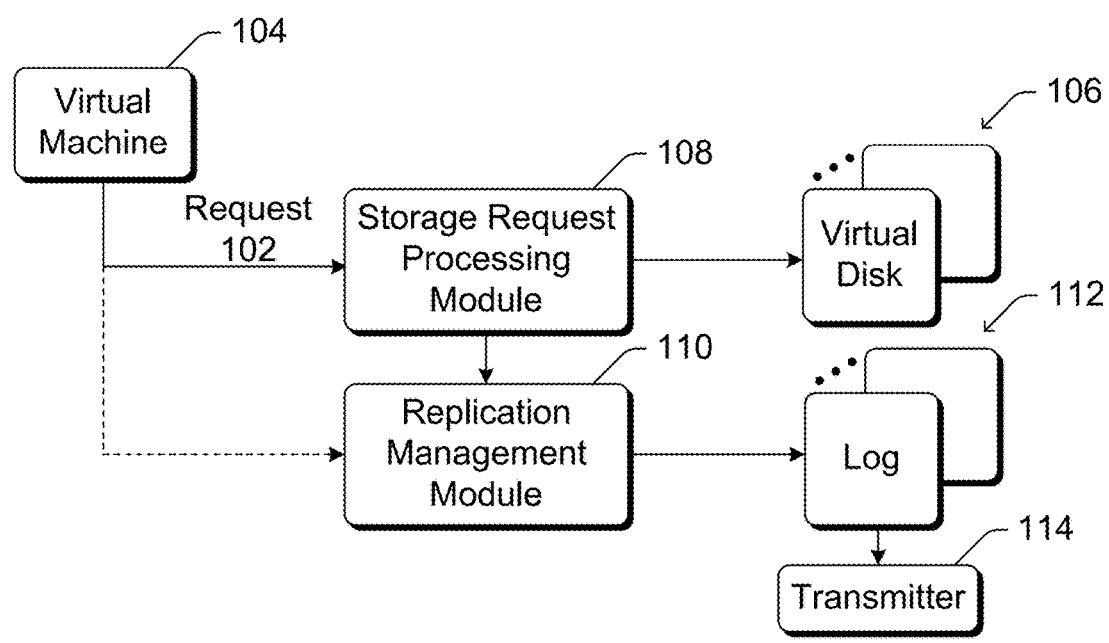
FIG. 1 illustrates an example system implementing the request ordering support when switching virtual disk replication logs in accordance with one or more embodiments.

Request ordering support when switching virtual disk replication logs is discussed herein. Storage access requests, such as write requests, are received from a virtual machine. A storage request processing module updates one of multiple virtual disks as directed by each of the storage access requests. Additionally, a replication management module stores information associated with each storage access request in one of multiple logs. The logs can be transferred to a recovery device at various intervals and/or in response to various events, which results in switching logs so that the replication management module stores the information associated with each storage access request in a new log and the previous (old) log is transferred to the recovery device. During this switching, request ordering for write order dependent requests is maintained at least in part by blocking processing of the information associated with each storage access request.

Various embodiments are discussed herein in terms of virtual machines. Virtualization generally refers to an abstraction from physical resources. Hardware emulation involves the use of software that represents hardware that the operating system would typically interact with. Hardware emulation software can support guest operating systems, and virtualization software such as a hypervisor can establish a virtual machine (VM) on which a guest operating system operates. Much of the description herein is described in the context of virtual machines, but the techniques discussed herein are equally applicable to physical machines that do not employ virtualization.

To enable recovery of a device in the event of a malfunction, the information associated with that device is provided to a recovery device. In the context of virtual machines, a base replication can be provided, and updates or changes to that base replication can be provided as the virtual machine is running on its primary device.

The techniques discussed herein support systems in which differencing disks or other similar mechanisms are not needed to provide virtual storage replication and virtual machine recovery. In one or more embodiments, one or more logs (e.g., log files), also referred to as replication logs, are created that capture changes being made to a storage device, including a virtual disk. In one virtual machine embodiment, the logs can be created by preserving duplicates of change requests that are queued for inclusion into the virtual disk. The log processing and updating can be performed in parallel with the processing that updates the virtual disk, such that replicated data is created without additional latencies, and the logs can be prepared in such a way that it can be easily transferred to a recovery device(s) while limiting the impact on the Input/Output Operations Per Second (IOPS) to the running workload. Thus, while the techniques discussed herein may be used in addition to technologies such as differencing disks when used for other purposes, replication may be effected without the existence of any differencing disks in accordance with the disclosure.

In one or more embodiments, a virtual machine's write requests that are destined for a virtual disk are copied to a log data structure, such as a log queue. The log entries are taken from the queue and processed into a log. Writes to the log can be accumulated in memory, versus storage such as a virtual disk, disk or other physical storage. The write request information may be accumulated in memory before writing to the physical disk in order to, for example, reduce the impact on workload performance and response times inside the virtual machine. The writes to the log may be coordinated with the writes to the virtual disk file (e.g., virtual hard disk or "VHD" file) to, among other things, facilitate application-consistent snapshots of virtual machines. Further, the log format can be agnostic to virtual hard disk file format and type, such that it can be used to capture changes to a virtual disk of any type and format.

FIG. 1 illustrates an example system 100 implementing the request ordering support when switching virtual disk replication logs in accordance with one or more embodiments. Storage access requests 102 may be provided by any source, such as a virtual machine (VM) 104. Although illustrated as being provided by virtual machine 104, storage requests 102 can additionally or alternatively be provided by other components or modules, such as processors or other sources. The storage access requests 102 may be any type of storage access requests, such as write requests, requests to expand or contract the disk, or any other storage operations that can result in changes to the disk. In one or more embodiments, the storage access requests 102 represent write requests to store data.

In the illustrated embodiment, the data is stored in one or more virtual disks 106, each of which can represent one or more files stored on physical storage media. A storage request processing module 108 directs and processes incoming requests 102 to the virtual disks 106. For example, the requests 102 may represent write requests that are temporarily buffered at storage request processing module 108 until they can be used to update a virtual disk 106. Each virtual disk 106 may include a single virtual storage file (e.g., VHD file) or multiple files (e.g., a VHD file and one or more differencing disk files (also referred to as AVHD files)). Thus, for example, changes to a virtual disk 106 may be made to a single file representing the virtual disk 106, and logs as discussed herein may be used in lieu of differencing disks or similar states of the virtual disk 106 for replication purposes.

Replication management module 110 receives the same storage access requests 102 that are being received at storage request processing module 108. Storage access requests 102 may be received in different manners, such as from the virtual machine 104, from an intermediate module (not shown), from storage request processing module 108 itself, and so forth. In one or more embodiments, replication management module 110 is implemented integrally with storage request processing module 108. In such situations, replication management module 110 may receive a copy of the storage access requests 102 upon receipt of the requests 102 at storage request processing module 108, or storage request processing module 108 may create and provide a copy of storage access requests 102 to replication management module 110. It should be noted that modules such as storage request processing module 108 and replication management module 110 can be implemented in different manners. For example, module 108 and/or module 110 may be provided within the virtual machine 104, may be provided by a hypervisor, may be provided by a parent partition operating system or other operating system, and so forth.

Replication management module 110 can buffer the storage access requests 102 in parallel with the buffering and/or processing of the storage access requests 102 by the storage request processing module 108. The buffered storage access requests 102 are written to one or more logs 112, such as a log file, for replication purposes and typically without significantly impacting storage IOPS. Typically, each virtual disk 106 has a corresponding log 112. As write requests or other storage access requests 102 are being processed to update the virtual disks 106 in response to virtual machine 104 processing, replication management module 110 tracks changes to the virtual disks 106 in one or more logs 112.

At various intervals and/or in response to various events, logs 112 can be transmitted, such as via transmitter 114, elsewhere (e.g., to a recovery device) where a recovery system or virtual machine may be instantiated to replicate the virtual machine 104. Transmitter 114, which may be a stand-alone transmitter or associated with another device (e.g., a transceiver, a network interface module, etc.), can provide the log 112 to a destination such as a recovery system or server as a recovery replica of at least a portion of a virtual disk 106. When one log is transmitted elsewhere, the log being transferred is referred to as the old log, and a new log is created. The buffered storage access requests are then written to the new log rather than the old log. This process of changing from storing the storage access requests in the new log rather than the old log is also referred to as log switching.

Figure 2:
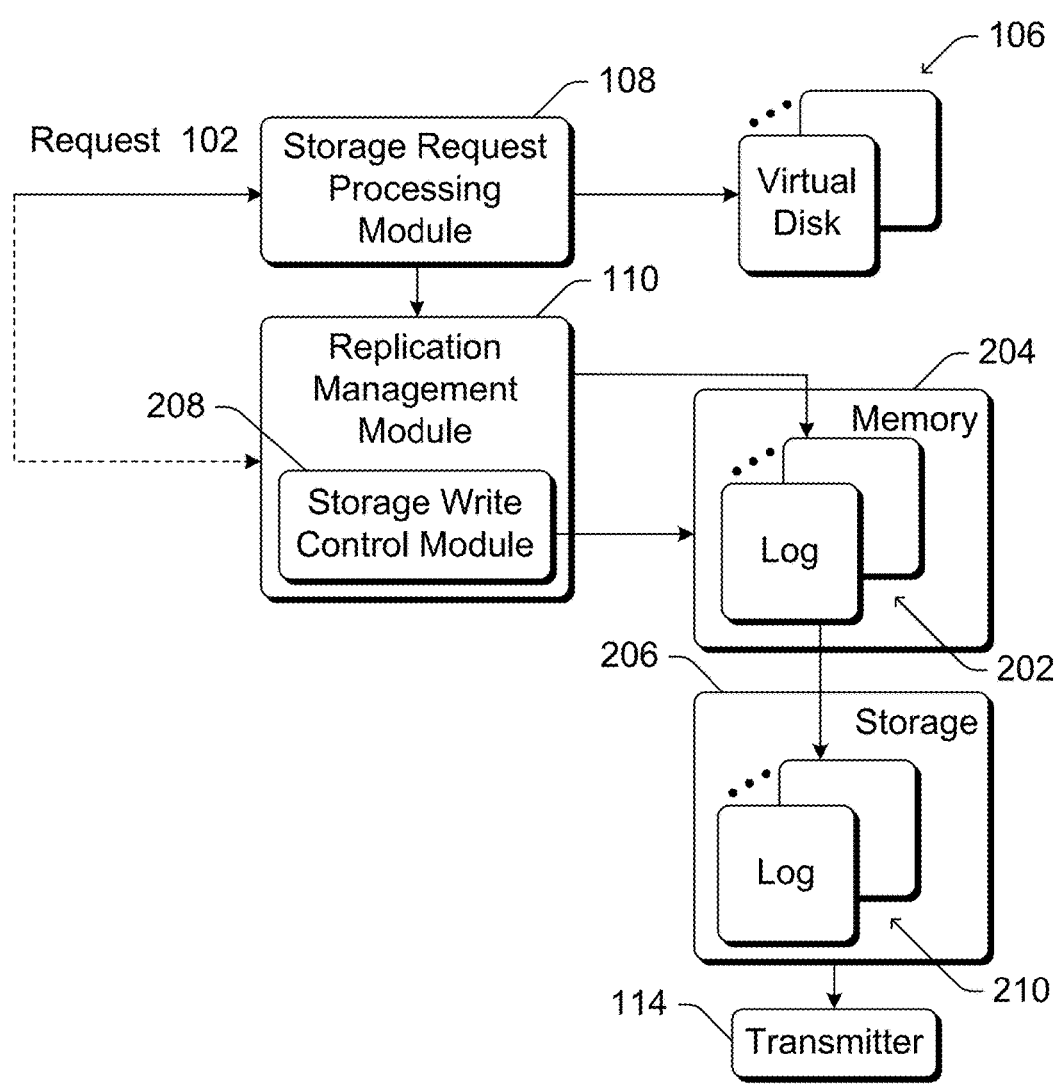
FIG. 2 illustrates another example system implementing the request ordering support when switching virtual disk replication logs in accordance with one or more embodiments.

FIG. 2 illustrates another example system 200 implementing the request ordering support when switching virtual disk replication logs in accordance with one or more embodiments. System 200 is similar to system 100 of FIG. 1, including storage (e.g., write) requests 102, one or more virtual disks 106, a storage request processing module 108, and a replication management module 110. In system 200, a virtual machine or other source issues write requests 102 that will ultimately change one or more virtual disks 106 with the data being written thereto. Both storage request processing module 108 and replication management module 110 receive the write requests 102. As storage request processing module 108 processes the write requests 102 for inclusion on a virtual disk 106, replication management module 110 queues the write requests 102 for writing to one or more logs 202.

In one or more embodiments, logs 202 are captured in memory 204 (e.g., random access memory) to reduce input/output (I/O) processing and improve IOPS relative to solutions involving writing to disk such as differencing disks. Each log 202 may be written to storage 206 (e.g., a magnetic or optical disk, a Flash memory drive, etc.) at desired regular or irregular intervals such as, for example, fixed intervals, random intervals, intervals based on triggered events (e.g., the size of all logs 202 in memory 204, the size of a particular log 202 in memory 204, etc.), and so forth. Replication management module 110 includes a storage write control module 208 that determines when a log 202 in memory 204 is to be written to storage 206 as illustrated by one or more logs 210. In one or more embodiments, storage write control module 208 writes a log 202 to storage 206 as a log 210 when memory 204 that has been allocated for the log 202 reaches a threshold. Each log 210 is typically a single file in storage 206, but can alternatively be multiple files and/or portions of a file (e.g., multiple logs may be stored in a single log file). For example, a write of a log 202 from memory 204 to log 210 in storage 206 may occur when the allocated memory for log 202 reaches 90% capacity. In one or more embodiments, storage write control module 208 also writes a log 202 to storage 206 as a log 210 when the log for the corresponding virtual disk 106 is to be switched to a new log, as discussed in more detail below. By accumulating write requests 102 in memory 204 and infrequently writing the logs to physical storage 206, the impact on virtual machine workload performance and response times inside the virtual machine can be reduced.

At various intervals and/or in response to various events, logs 202 and/or 210 can be transmitted, such as via transmitter 114, elsewhere as discussed above with reference to FIG. 1. When one log is transmitted elsewhere, the buffered storage access requests are then written to the new log rather than the old log.

In systems 100 of FIG. 1 and 200 of FIG. 2, virtual machines or other sources may issue storage access requests having particular ordering requirements. For example, database, mail server, or other applications in the virtual machine may implement their own recovery mechanisms and desire to have particular storage access requests (e.g., particular writes) occur in a particular order as part of those recovery mechanisms. Replication management modules 110 account for these ordering requirements when switching logs, as discussed in more detail below.

Figure 3:
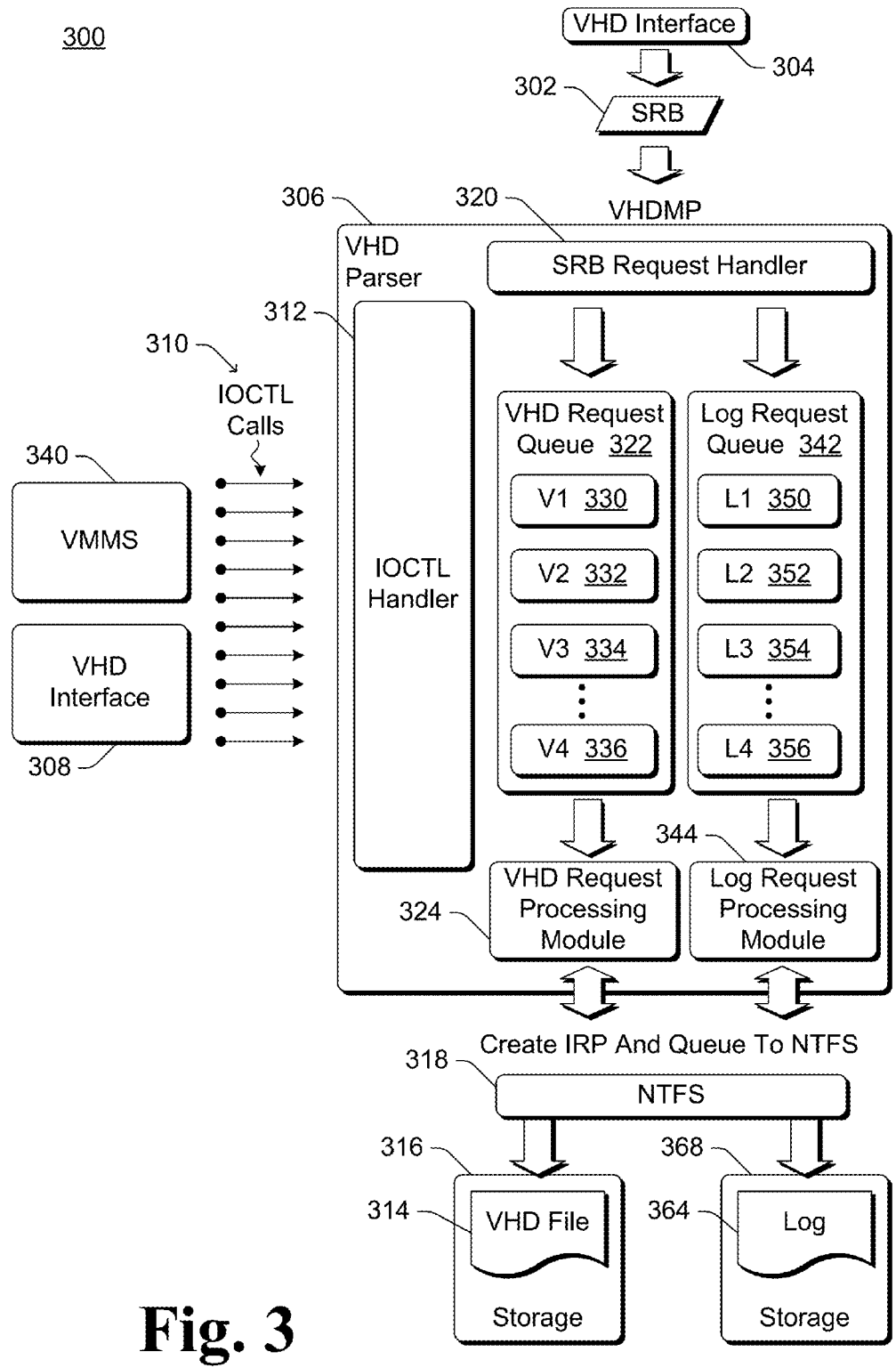
FIG. 3 illustrates an example architecture for implementing the request ordering support when switching virtual disk replication logs in accordance with one or more embodiments.

FIG. 3 illustrates an example architecture 300 for implementing the request ordering support when switching virtual disk replication logs in accordance with one or more embodiments. Architecture 300 can implement, for example, a system 100 of FIG. 1 or a system 200 of FIG. 2. Architecture 300 is discussed with reference to the storage access requests being I/O write requests, although various other types of storage access requests can also be processed by architecture 300. In the example architecture 300 the write requests are implemented as small computer system interface (SCSI) request blocks (SRBs) 302. SRB 302 is a representative manner in which an I/O request can be submitted to a storage device. SRB 302 may include information such as the command to send to the device, the buffer location and size, and so forth. In one or more embodiments, each change request to a virtual disk is in the form of an SRB 302. While SRBs are discussed as an example, it should be noted that various other I/O request types can be used with the techniques discussed herein.

In the illustrated example, SRB 302 is provided by an interface to upper layers, shown as VHD interface 304 (e.g., which may be implemented in a VHD parser system or .sys file). In this example, VHD interface 304 represents an internal interface to the upper layers, which performs internal translation and sends SRB 302 to a replication management module, which in FIG. 3 is part of virtual disk parser 306. Storage requests may also be provided via the VHD interface 308, which is also an interface to upper layers, where the storage requests may be provided via an input/output control (IOCTL) call 310 that is handled by an IOCTL handler 312 of virtual disk parser 306. IOCTL handler 312 provides an interface through which an application on the virtual machine can communicate directly with a device driver using control codes. Thus, storage access requests may be received via one or more different input types.

In one or more embodiments, virtual disk parser 306 can be an adaptation of a virtual hard disk (VHD) mini-port, such as VHDMP.sys available in the Hyper-V® virtualization system available from Microsoft Corporation of Redmond, Wash. Assuming in this example that the virtual disk is represented by a VHD file 314, the storage stack for such VHD files 314 can include a mini-port driver such as VHDMP.sys, which represents VHD parser 306. VHD parser 306 enables I/O requests to the VHD file 314 in storage 316 (e.g., a magnetic or optical disk, a Flash memory drive, etc.) to be sent to the host file system. The host file system is illustrated as a new technology file system (NTFS) 318, although various other host file systems can alternatively be used.

For purposes of example, it is assumed in the description of example architecture 300 that SRBs 302 include write requests to change a virtual disk such as VHD file 314. SRBs 302, which originate inside the virtual machine, reach virtual disk parser 306 at SRB request handler 320. In one or more embodiments, SRB request handler 320 creates an instance of a custom data structure for each SRB 302, and embeds the SRB 302 inside this instance which is added to VHD request queue 322. VHD request queue 322 maintains the write requests to VHD file 314 that are pending for processing. SRB request handler 320 adds these SRBs 302 to queue 322, and as described below VHD request processing module 324 removes the write requests from VHD request queue 322 to process the write requests. Multiple representative VHD request queue 322 entries are depicted as V1 330, V2 332, V3 334 and V4 336. VHD request queue 322 and VHD request processing module 324 together can be a storage request processing module 108 of FIG. 1 or FIG. 2.

In one or more embodiments, IOCTL handler 312 may also receive requests from management modules, such as virtual machine management service (VMMS) 340 (e.g., an executable or .exe file) provided as part of the Hyper-V® virtualization system. VMMS 340 generally represents a management service that serves as a point of interaction for incoming management requests. VMMS 340 can provide requests to IOCTL handler 312 for enabling and disabling change tracking for a virtual disk. For example, VMMS 340 may issue a request via an IOCTL call 310 to IOCTL handler 312, which causes log request queue 342 and log request processing module 344 to be initialized. VMMS 340 can also provide requests to IOCTL handler 312 for managing the switching of logs while the virtual machine is running. For example, VMMS 340 may issue requests to advance virtual disk parser 306 through multiple stages of switching logs, as discussed in more detail below.

When change tracking is enabled, another instance of the custom data structure for the SRB 302 that is added to VHD request queue 322 is created and added as an entry to log request queue 342. In one or more embodiments, a data buffer of write requests (e.g., SRBs 302) may be shared by the custom data structure instances for the SRBs 302 in both VHD request queue 322 and log request queue 342. Log request queue 342 maintains the log write requests that are pending for processing. Representative log request queue 342 entries are depicted as L1 350, L2 352, L3 354 and L4 356. Entries of log request queue 342 and VHD request queue 322 correspond to one another—an entry of log request queue 342 that includes the same SRB 302 (or references the same shared SRB 302) as an entry of VHD request queue 322 is referred to as corresponding to or being associated with that entry of VHD request queue 322. Log request queue 342 and log request processing module 344 together can be a replication management module 110 of FIG. 1 or FIG. 2.

VHD request processing module 324 removes queued write requests from queue entries 330-336 of VHD request queue 322 to process the write requests. VHD request processing module 324 processes write requests by writing the requested data to VHD file 314. Based on the virtual hard disk format and type, in one or more embodiments VHD request processing module 324 sends one or more I/O request packets (IRPs) to VHD file 314 via NTFS 318 to complete each write request.

Log request processing module 344 removes queued write requests from log queue entries 350-356 of log request queue 342 to process the write requests. Log request processing module 344 processes the write requests or log queue entries by storing in log 364 the log queue entries 350-356 that include the write requests. Log 364 can be one or more log files, and the log queue entries 350-356 can be stored to the one or more log files via NTFS 318. Thus, log request queue 342 is copied to log 364 that, in the illustrated embodiment, is stored in storage 368 (e.g., a magnetic or optical disk, a Flash memory drive, etc.). Storage 368 may be the same or different storage as storage 316 in which the VHD files are stored. It should be noted that in one or more embodiments, while the log 364 may be stored in some storage 368, the log is cached or otherwise buffered in memory (e.g., random access memory) until a time when the log is to be sent to storage 368. Log request processing module 344 processing the write requests or log queue entries includes storing the log queue entries 350-356 that include the write requests in such a cache or buffer.

New log entries for write requests are created for each new storage request and placed in log request queue 342, typically substantially in parallel with the creating and placing of a new VHD request queue entry for the write request in VHD request queue 322. Similarly, the next write request in log request queue 342 is removed and copied to log 364, typically substantially in parallel with the corresponding entry for the write request being removed from VHD request queue 322 and processed by VHD request processing module 324. VHD request queue 322 and log request queue 342 are typically first-in-first-out (FIFO) queues, although other queuing techniques can alternatively be used.

A particular queued write request (e.g., a request in one of queue entries 330-336) is considered to be complete in response to two conditions being satisfied: 1) all of the issued IRPs to VHD file 314 for the write request are completed, and 2) the log request queue entry corresponding to the VHD request queue entry that includes the write request is written to log 364. The log request queue entry being written to log 364 refers to the log request queue entry being added to the log regardless of whether the log is cached or otherwise buffered in memory (e.g., the log request queue entry can be written to log 364 even though the log, and thus the log request queue entry, is being maintained in a buffer or other memory rather than storage 368). In response to a particular write request being complete, VHD parser 306 returns a completion response for the particular write request to the virtual machine from which the particular write request was received. The completion response can be returned to the virtual machine by any of various components or modules of virtual parser 306.

In one or more embodiments, the log can be stored (at least temporarily) in memory as discussed above. The log stored in memory can be directly transmitted to one or more recovery devices from memory. Alternatively, the log can be written to a physical storage medium (e.g., magnetic or optical disk, Flash memory disk, etc.) and subsequently transmitted elsewhere (e.g., to one or more recovery devices) from the physical storage medium. Regardless of whether the log is transmitted from memory or a physical storage medium, various conditions can dictate when the log will be transmitted elsewhere. The condition may be, for example, a time, a time duration, a triggering event, and so forth. For example, the condition may be a particular time interval (e.g., five minutes), a particular event (e.g., a log file reaching a threshold size and/or having a threshold number of entries), and so forth. The recovery devices can be any of a variety of different recovery servers and/or recovery storage devices.

When the log, referred to as the old log, is transmitted elsewhere (e.g., to a recovery device), a new log is created. Log request processing module 344 then proceeds to store entries in log request queue 342 into the new log. This process of changing from storing entries in log request queue 342 into the new log rather than the old log is also referred to as log switching.

The recovery device is a separate computing device from the device implementing architecture 300 and/or a separate storage device from storage 316 (and storage 368). The recovery device receives the transmitted log and maintains or otherwise uses the transmitted log for recovery purposes. For example, if a malfunction were to occur in the device implementing architecture 300, then the logs received by the recovery device can be used to recreate VHD file 314. The recovery device can maintain or otherwise use the transmitted log in different manners. In one or more embodiments, the recovery device stores the log, allowing the requests in the log to be subsequently applied, if recovery of VHD file 314 is desired, to a previously stored copy of VHD file 314 (a copy of VHD file 314 that does not include the changes indicated in the log, and that is stored on the recovery device or elsewhere) in order to recover VHD file 314. Alternatively, the requests in the log can be processed and applied to a previously stored copy of VHD file 314 (a copy of VHD file 314 that does not include the changes indicated in the log, and that is stored on the recovery device or elsewhere), allowing a duplicate copy of VHD file 314 to be maintained at the recovery device. The request in the log can be processed and applied to a previously stored copy of VHD file 314 in a manner analogous to that performed by VHD request processing module 324 in processing requests in VHD request queue 322 as discussed above.

Log 364 includes the storage requests from log request queue 342, as well as sufficient additional data for VHD file 314 to be recovered and/or replicated. Log 364 can include various data and/or metadata regarding the storage requests stored in log 364 from log request queue 342 and VHD file 314. In one or more embodiments, log 364 includes a header portion, one or more metadata portions, and one or more data portions. The one or more data portions include the entries from the log request queue (or alternatively the data from the entries of the log request queue) that include the write requests or other storage requests.

The header portion includes, for example, information to identify the log, information to indicate the size of one or more metadata portions, information to indicate how many metadata portions are included in the log, and information to indicate the location of the last valid data of the log (the end of the log or EOL). The header portion can include various other information, such as a version identifier of the log, a time stamp indicating when the log was created (and/or last modified), a size of the log, a checksum for the log, an error code (e.g., indicating whether an error occurred in creating or receiving the log), and so forth.

Each metadata portion includes, for example, a metadata header and one or more metadata entries. The metadata provides, for example, information describing the changes to the virtual disk (the VHD file). For example, the metadata header can include an indication of the size of the metadata header, an indication of the location of the previous metadata portion in the log, an indication of the location of the next metadata portion in the log, an indication of the number of metadata entries in the metadata portion, a checksum value for the metadata portion, and so forth. Each metadata entry provides, for example, information about the virtual disk address range that is modified. For example, each metadata entry can include a byte offset that indicates an actual physical address on the virtual disk that was modified, a checksum value for the metadata entry, a data length indicating a size of the data in a data portion, a timestamp value indicating a time and/or date when the storage request resulting in the data in a data portion was received by the VHD parser, the meta operation of the data in a data portion (e.g., a write operation, a no operation (NOOP), etc.), and so forth.

In the example architecture 300, although one VHD file 314 and one log 364 are illustrated, in one or more embodiments architecture 300 includes multiple VHD files 314 (stored in the same and/or different storage 316) as well as multiple logs 364 (stored in the same and/or different storage 368). VHD parser 306 can include a separate VHD request queue for each VHD file with each VHD request queue corresponding to a single VHD file, or alternatively a single VHD request queue can correspond to (and thus include entries for) multiple different VHD files. VHD parser 306 can also include a separate log request queue for each log with each log request queue corresponding to a single log, or alternatively a single log request queue can correspond to (and thus include entries for) multiple different logs.

In situations in which the system (e.g., system 100 of FIG. 1 and/or system 200 of FIG. 2) or architecture (e.g., architecture 300 of FIG. 3) includes multiple logs, the log switching includes switching of all of the multiple logs at approximately the same time. However, there is typically no guaranteed ordering in which the logs are switched, typically no dependency on one log being switched before another, and typically no guaranteed speed at which the logs are switched. Accordingly, a virtual machine cannot rely on logs being switched in a particular order.

Figure 4:
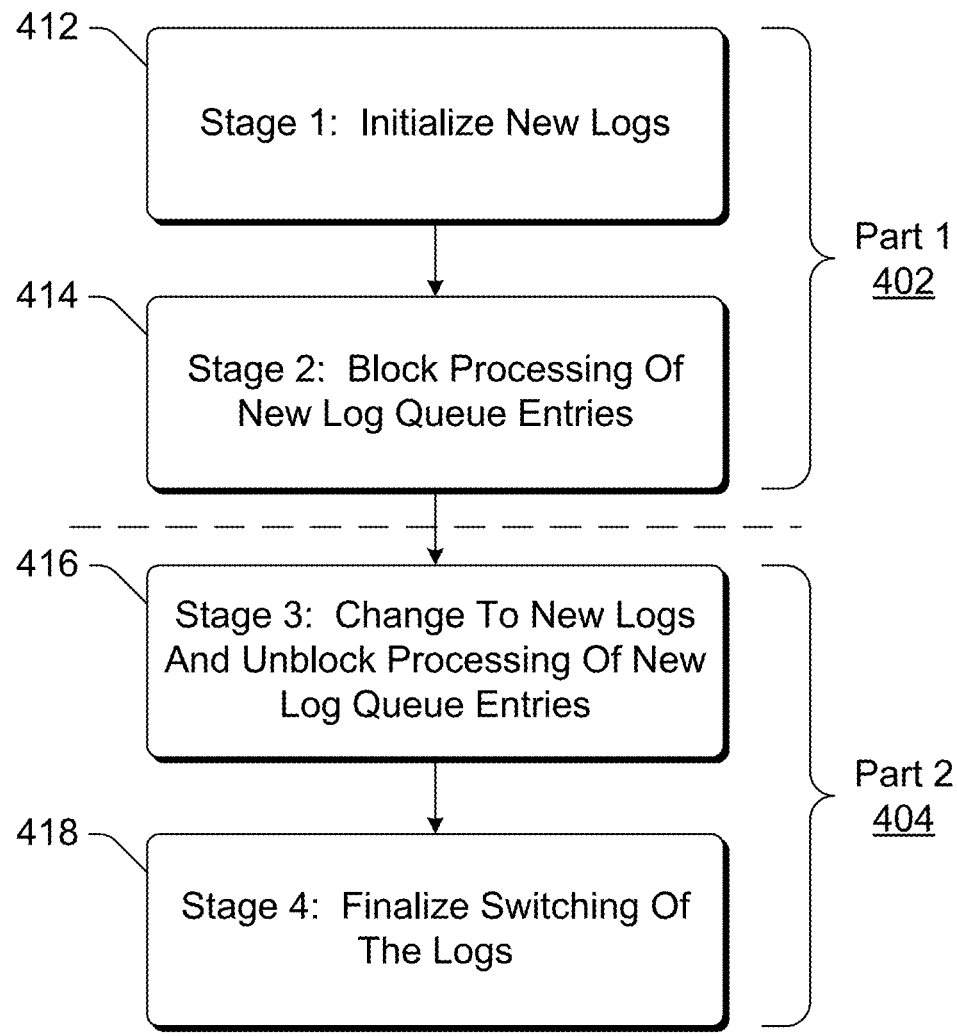
FIG. 4 is a flowchart illustrating an example process for implementing request ordering support when switching virtual disk replication logs in accordance with one or more embodiments.

FIG. 4 is a flowchart illustrating an example process 400 for implementing request ordering support when switching virtual disk replication logs in accordance with one or more embodiments. Process 400 is carried out, for example, by a system 100 of FIG. 1, a system 200 of FIG. 2, and/or an architecture 300 of FIG. 3, and can be implemented in software, firmware, hardware, or combinations thereof. Process 400 is shown as a set of acts and is not limited to the order shown for performing the operations of the various acts. Process 400 is an example process for implementing request ordering support when switching virtual disk replication logs; additional discussions of implementing request ordering support when switching virtual disk replication logs are included herein with reference to different figures.

Generally, process 400 is performed in two parts. In a first part 402, the new logs are initialized and processing of new log queue entries is blocked. Blocking of new log queue entries refers to entries in the log queue not being processed (e.g., by log request processing module 344 of FIG. 3) and stored in the log file; however, new entries can be added to the log request queue while processing of new log queue entries is blocked. In a second part 404, the new logs are changed to, processing of new log queue entries is unblocked, and the switching of logs is finalized. After the processing of new log queue entries is unblocked, entries in the log queue can be processed (e.g., by log request processing module 344 of FIG. 3) and stored in the new logs.

More specifically, first part 402 includes a first stage 412 in which the new logs are initialized. For each log being switched (e.g., each current log), a new log is initialized. Initializing a new log refers to generating the appropriate data structures, creating the appropriate headers, and so forth for the new log. During first stage 412, log queue entries continue to be processed (e.g., by log request processing module 344 of FIG. 3), and VHD request queue entries continue to be processed (e.g., by VHD request processing module 324 of FIG. 3).

First part 402 also includes a stage 414 in which processing of new log queue entries is blocked. Stage 414 occurs after all of the new logs are initialized (although alternatively may occur after less than all of the new logs are initialized). In stage 414, log queue entries can be added to the log request queue, VHD queue entries can be added to the VHD request queue, and VHD queue entries can be processed (e.g., by VHD request processing module 324 of FIG. 3), but log queue entries are not processed (e.g., by log request processing module 344 of FIG. 3). As discussed above, a storage request is not indicated as being completed until both the VHD queue entry is processed and the corresponding log queue entry is processed. Thus, although VHD queue entries can be processed while processing of new log queue entries is blocked, the requests in such processed VHD queue entries are not indicated as being completed because the corresponding log queue entry has not yet been processed.

Second part 404 includes a stage 416 in which the change to the new logs occurs and processing of new log queue entries is unblocked. For each log being switched, the new log (initialized in stage 412) is changed to in stage 416. Changing to the new log refers to any pointers or other indications of the log to be used being changed to the new log rather than the old log (the log being switched from, and in which log queue requests were stored prior to blocking processing of the new log queue entries in stage 414). For all logs being switched, after the new logs have been changed to, processing of new log queue entries is unblocked. After processing of new log queue entries is unblocked, the operation of the system or architecture resumes as discussed above—VHD queue entries can be added to the VHD request queue and processed (e.g., by VHD request processing module 324 of FIG. 3), and log queue entries can be added to the log request queue and processed (e.g., by log request processing module 344 of FIG. 3).

Second part 404 also includes a stage 418 in which switching of the logs is finalized. Finalizing switching of the logs includes various operations to transfer the old logs elsewhere (e.g., to a recovery device). Finalizing switching of the logs can include, for example, flushing any queue entries of the old log in memory to storage, adding additional information to a header of the old log, transmitting the old log elsewhere, and so forth. Stage 418 typically occurs after processing of the new log queue entries is unblocked, although stages 416 and 418 can alternatively be performed at least in part at the same time (so at least some of the finalization in stage 418 can be performed while the new logs are being changed to and processing of the new log queue entries is being unblocked in stage 416).

Figure 5:
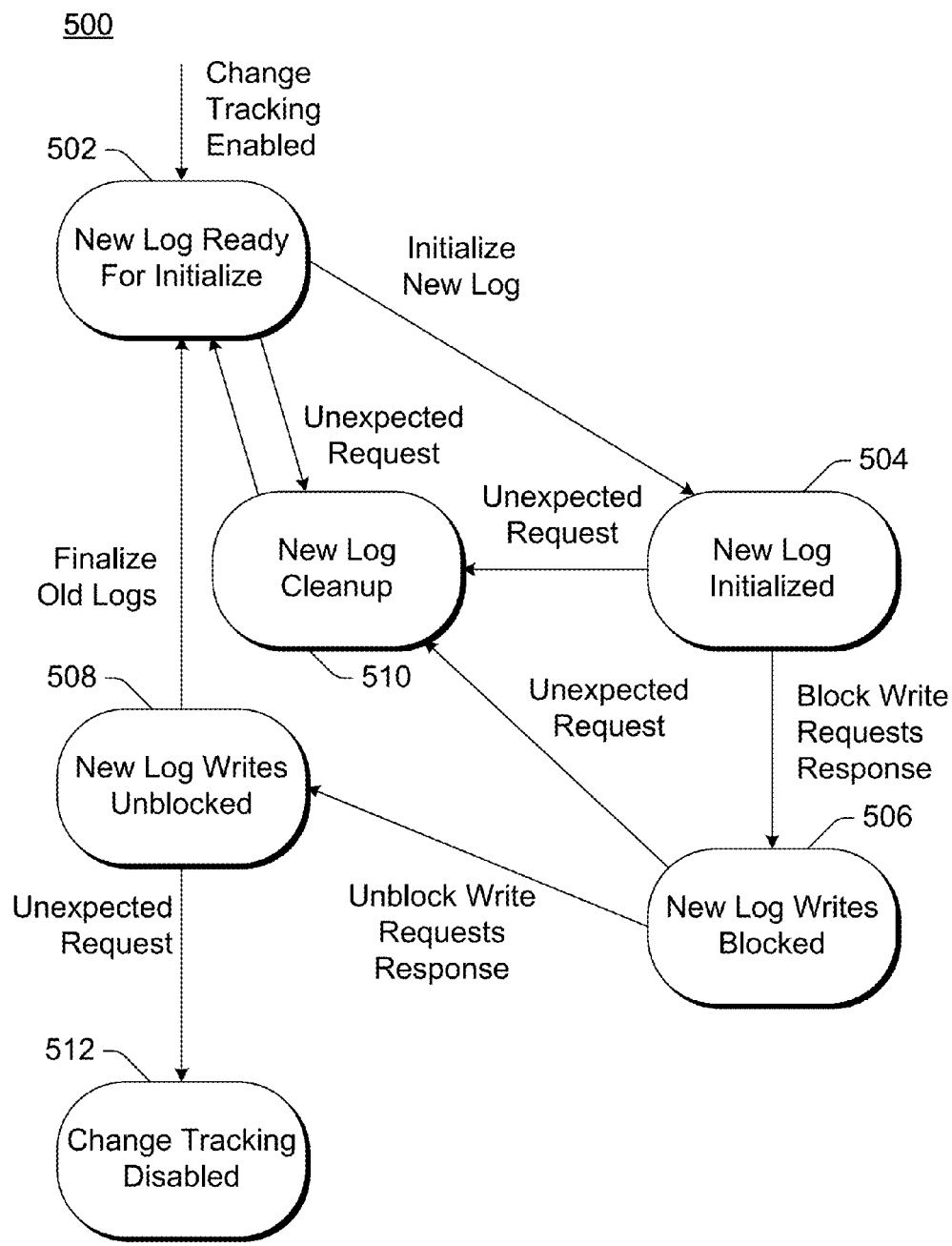
FIG. 5 is a state diagram illustrating example states for implementing request ordering support when switching virtual disk replication logs in accordance with one or more embodiments.

FIG. 5 is a state diagram 500 illustrating example states for implementing request ordering support when switching virtual disk replication logs in accordance with one or more embodiments. State diagram illustrates the different states that a component or module of a VHD parser (e.g., VHD parser 306 of FIG. 3) or replication management module (e.g., module 110 of FIGS. 1 and 2) transitions through.

State diagram 500 is discussed with reference to a switch manager implementing state diagram 500. The switch manager may be IOCTL handler 312 of FIG. 3, another component or module of the VHD parser or replication management module, and so forth. Commands or requests to transition to different states are received by the switch manager from a management service (or other module), such as VMMS 340 of FIG. 3, another component or module of a hypervisor, and so forth.

When change tracking is enabled (e.g., the use of logs and log request queues as discussed herein is enabled), the switch manager transitions to a new log ready for initialize state 502. The switch manager waits in state 502 until an initialize new log command is received from the management service. The initialize new log command is received after some interval elapses, an event occurs, etc. as discussed above.

In response to the initialize new log command, the switch manager transitions to a new log initialized state 504. In state 504, the switch manager initializes (or communicates with one or more other modules or components to initialize) the new logs. The first stage 412 of FIG. 4 is implemented by the switch manager while in state 504. After the new logs are initialized, the switch manager notifies (e.g., communicates a response to) the management service that the new logs are initialized.

In response to the notification that the new logs are initialized, the management service sends to the switch manager a block write requests response. In response to the block write requests response, the switch manager transitions to a new log writes blocked state 506. In state 506, the switch manager blocks processing of new log queue entries (e.g., by notifying log request processing module 344 to cease processing of log queue entries), and changes from the old logs to the new logs. This change can be, for example, providing indications (e.g., identifiers of) the new logs to log request processing module 344. The second stage 414 of FIG. 4 as well as part of the third stage 416 (the changing to the new logs) is implemented by the switch manager while in state 506. After processing of new log queue entries is blocked and the change to the new logs is completed, the switch manager notifies (e.g., communicates a response to) the management service that processing of new log queue entries is blocked and the change to the new logs is completed.

In response to the notification that processing of new log queue entries is blocked and the change to the new logs is completed, the management service sends to the switch manager an unblock write requests response. In response to the unblock write requests response, the switch manager transitions to a new log writes unblocked state 508. In state 508, the switch manager unblocks processing of new log queue entries (e.g., by notifying log request processing module 344 to resume processing of log queue entries), and finalizes switching of the logs. Various operations can be performed in finalizing switching of the logs, as discussed above. The fourth stage 418 of FIG. 4 is implemented by the switch manager while in state 508. After processing of new log queue entries is unblocked and the switching of the logs is finalized, the switch manager notifies (e.g., communicates a response to) the management service that processing of new log queue entries is unblocked and the switching of the logs is finalized.

In response to notification that processing of new log queue entries is unblocked and the switching of the logs is finalized, the management service sends to the switch manager a finalize old logs request. In response to the finalize old logs request, the switch manager transitions to new log ready for initialize state 502.

While in state 502, 504, or 506, an unexpected request may be received by the switch manager. An unexpected request received refers to a request other than a request that would allow the switch manager to transition to the next state to continue the log switching (e.g., any request other than an initialize new log request while in state 502, any request other than a block write requests response while in state 504, any request other than an unblock write requests response while in state 506). In response to an unexpected request, the switch manager transitions to new log cleanup state 510. In new log cleanup state 510, the switch manager performs various operations to undo any changes made as part of the log switching. These operation can include, for example, deleting new logs that were created, preventing old logs from being changed from, and so forth. After completing the various operations to undo any changes made as part of the log switching, the switch manager transitions to new log ready for initialize state 502.

Similarly, while in state 508 an unexpected request may be received by the switch manager. An unexpected request refers to a request other than a request that would allow the switch manager to transition to the next state to continue the log switching (e.g., any request other than a finalize old log request). In response to an unexpected request, the switch manager transitions to change tracking disabled state 512. In state 512, change tracking (e.g., the use of logs and log request queues as discussed herein) is disabled). If an unexpected request is received at state 508, the switch manager assumes that a significant problem has occurred and thus, rather than entering new log cleanup state 510, disables change tracking.

In one or more embodiments, situations can arise where the management service malfunctions (e.g., crashes or otherwise ceases normal operation) during log switching. In order to avoid such a malfunction from causing processing of new log queue entries from being blocked indefinitely (e.g., due to an unblock write requests response not being received from the management service because of the malfunction), the switch manager maintains a context for the management service when an initialize new log request is received. This context is identified as part of the initialize new log request, and is typically referred to as a handle that is opened by the management service or other identifier assigned by (or reported to) the operating system. If the management service malfunctions, any such handles or identifiers of the management service are closed by the operating system, and the switch manager is notified of such closures. Thus, if a handle maintained as the context for the management service by the switch manager is closed prior to a finalize old log request being received having that same handle, then the switch manager determines that the management service malfunctioned during the log switching. The switch manager proceeds to take appropriate remedial action (e.g., transition to new log cleanup state 510 and/or change tracking disabled state 512), including unblocking processing of new log queue entries. Thus, a malfunction in the management service will not cause processing of new log queue entries to be blocked indefinitely.

The techniques discussed herein support various different usage scenarios. By blocking processing of new log queue entries but allowing processing of VHD queue entries during log switching, the performance impact due to the log switching is reduced because the VHD queue entries can continue to be processed. The processing of new log queue entries that is blocked can be writing of the log queue entries to memory rather than storage, as discussed above, so when the processing of new log queue entries is unblocked the new log queue entries can be processed quickly relative to the writing of VHD queue entries to storage.

Furthermore, the techniques discussed herein allow the log switching to occur while maintaining request ordering for write order dependent requests. In some situations, storage access requests issued from virtual machines have particular ordering requests. For example, an application of the virtual machine may use a write-ahead-logging (WAL) protocol in which one write request (e.g., a write to a database) to one VHD is not issued until confirmation of completion of another write request (e.g., a write to a log record maintained by the application) to another VHD is received. The techniques discussed herein allow log switching while maintaining such ordering constraints.

For example, assume that two write requests W1 followed by W2 are issued by a virtual machine, and that the order of the write requests is to be maintained (W2 is to be performed after W1). A response indicating completion of W1 is returned after W1 is written to both the VHD file and the log file, and in response to this indication the virtual machine issues W2. By blocking processing of a log queue entry for W1 while log switching, the write of W1 to the log file and thus the indication of completion of W1 is delayed until the log switching is completed. This blocking allows the situation where W1 and W2 are received after one log file is switched but before another log file is switched from resulting in W1 being written to a new log file (and thus not yet transferred to a recovery device) and W2 being written to an old log file (that is transferred to a recovery device as the log switching completes). Such a situation where W2 is transferred to a recovery device but W1 is not transferred would violate the request ordering for W1 and W2 in the recovery system, but is avoided using the techniques discussed herein.

Figure 6:
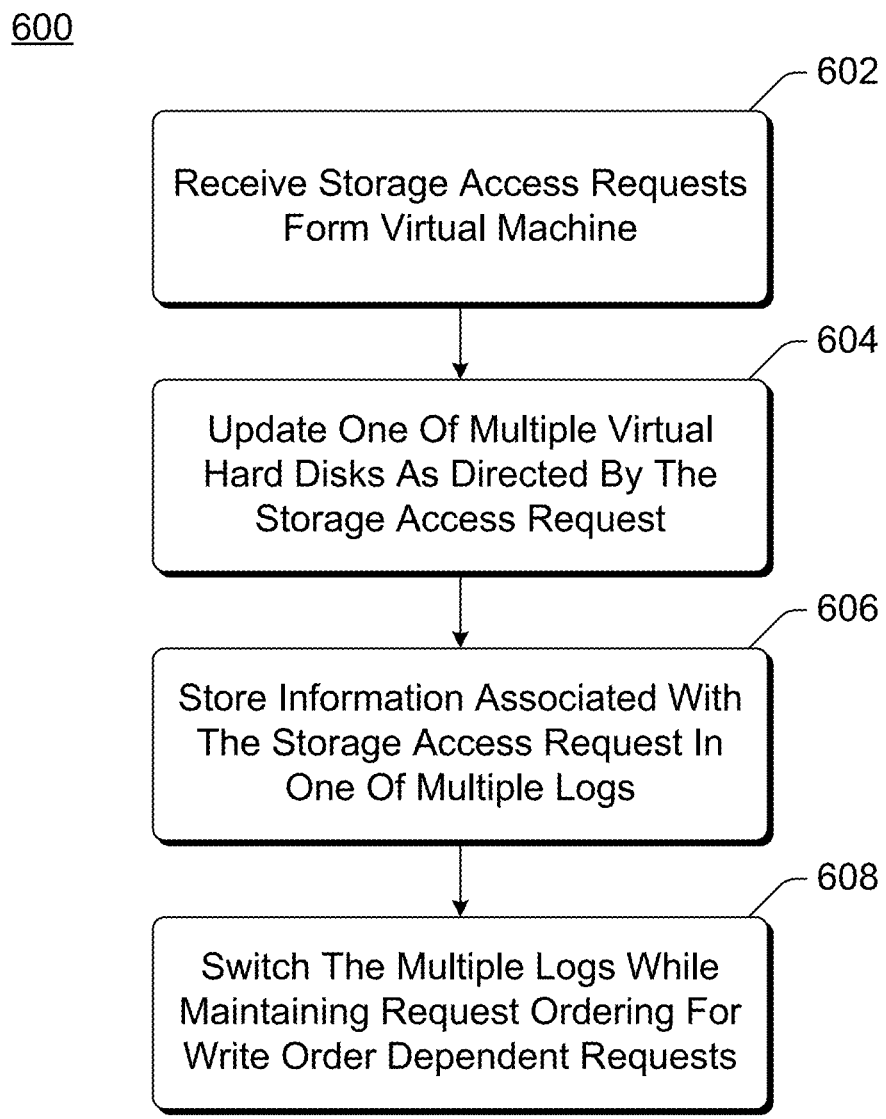
FIG. 6 is a flowchart illustrating an example process for implementing request ordering support when switching virtual disk replication logs in accordance with one or more embodiments.

FIG. 6 is a flowchart illustrating an example process 600 for implementing request ordering support when switching virtual disk replication logs in accordance with one or more embodiments. Process 600 is carried out, for example, by a system 100 of FIG. 1, a system 200 of FIG. 2, and/or an architecture 300 of FIG. 3, and can be implemented in software, firmware, hardware, or combinations thereof. Process 600 is shown as a set of acts and is not limited to the order shown for performing the operations of the various acts. Process 600 is an example process for implementing request ordering support when switching virtual disk replication logs; additional discussions of implementing request ordering support when switching virtual disk replication logs are included herein with reference to different figures.

In process 600, storage access requests are received from a virtual machine (act 602). These storage access requests can be write requests and/or other requests as discussed above.

One of multiple virtual hard disks is updated as directed by the storage access request (act 604). The updating can be, for example, writing data to the virtual hard disk as discussed above. Each storage access request typically indicates one virtual hard disk that is to be updated, but can alternatively indicate multiple virtual hard disks that are to be updated.

Information associated with the storage access request is also stored in one of multiple logs (act 606). Each log (e.g., a log file), also referred to as a replication log, can correspond to one of the virtual hard disks as discussed above.

The multiple logs are switched while maintaining request ordering for write order dependent requests (act 608). This switching can be done in multiple parts and/or multiple stages as discussed above. As part of this switching, the old logs (the logs being switched from) can be transferred to a recovery device, as discussed above. Request ordering is maintained for write order dependent requests at least in part by blocking processing of the information associated with each storage access request, such as by blocking storing log request queue entries in the log, as discussed above.

Various actions such as communicating, receiving, sending, storing, generating, and so forth performed by various modules are discussed herein. A particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 7:
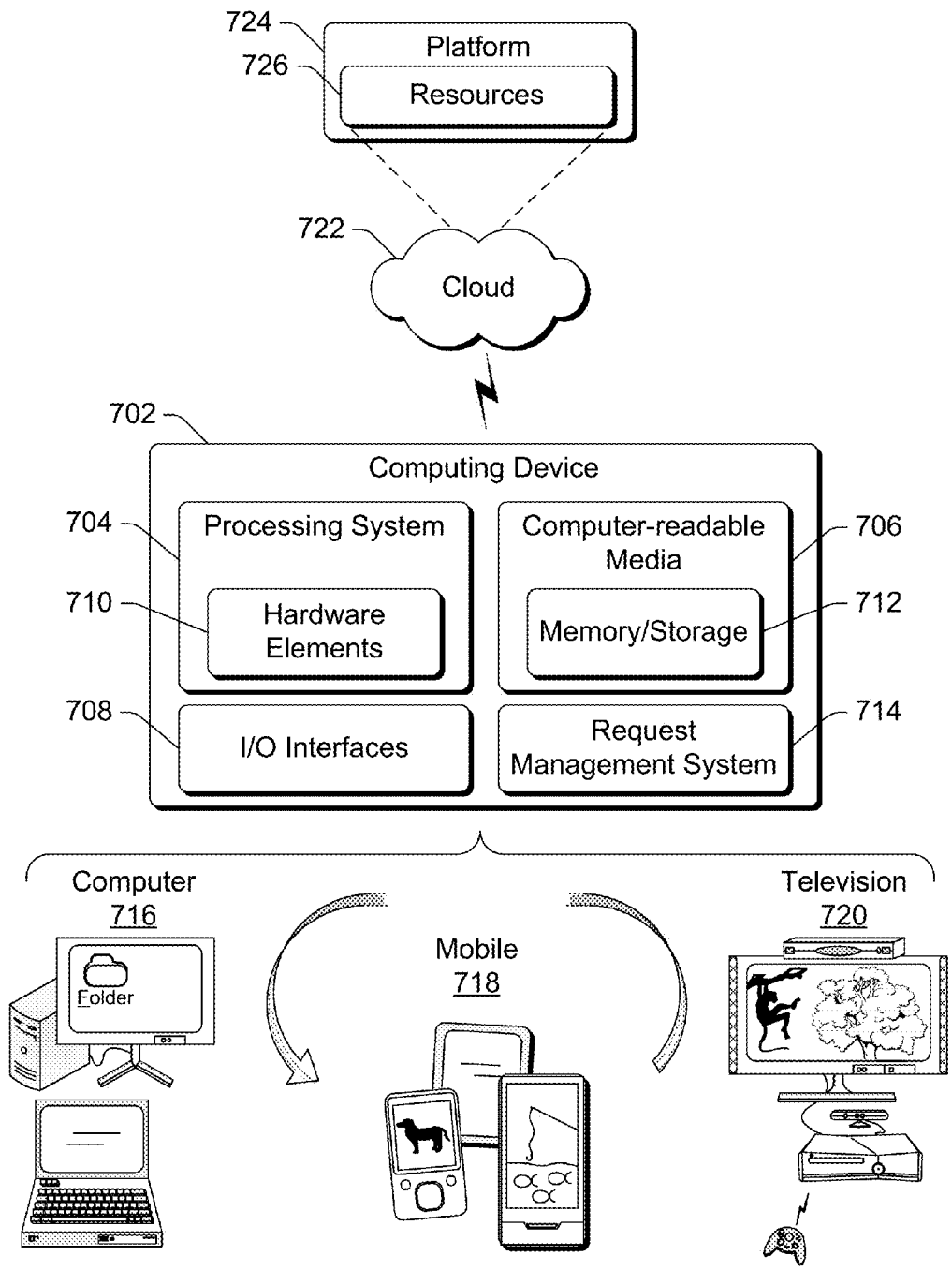
FIG. 7 illustrates an example system generally that includes an example computing device that is representative of one or more computing systems and/or devices that may implement the various techniques described herein.

FIG. 7 illustrates an example system generally at 700 that includes an example computing device 702 that is representative of one or more computing systems and/or devices that may implement the various techniques described herein. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O Interfaces 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware elements 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 706 is illustrated as including memory/storage 712. The memory/storage 712 represents memory/storage capacity associated with one or more computer-readable media. The memory/storage 712 may include volatile media (such as random access memory (RAM)) and/or nonvolatile media (such as read only memory (ROM), Flash memory, optical disks, magnetic disks, and so forth). The memory/storage 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 702 may be configured in a variety of ways as further described below to support user interaction.

Computing device 702 also includes a request management system 714. Request management system 714 provides various storage request processing and replication management functionality. Request management system 714 can implement, for example, storage request processing module 108 and replication management module 110 of FIG. 1 and/or FIG. 2, and/or VHD parser 306 of FIG. 3.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" refers to media and/or devices that enable persistent storage of information and/or storage that is not transitory, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of modules as a module that is executable by the computing device 702 as software may be achieved at least partially in hardware, e.g., through use of computer-readable storage media and/or hardware elements 710 of the processing system. The instructions and/or functions may be executable/operable by one or more articles of manufacture (for example, one or more computing devices 702 and/or processing systems 704) to implement techniques, modules, and examples described herein.

As further illustrated in FIG. 7, the example system 700 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 700, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 702 may assume a variety of different configurations, such as for computer 716, mobile 718, and television 720 uses. Each of these configurations includes devices that may have generally different constructs and capabilities, and thus the computing device 702 may be configured according to one or more of the different device classes. For instance, the computing device 702 may be implemented as the computer 716 class of a device that includes a personal computer, desktop computer, a multi-screen computer, laptop computer, netbook, and so on.

The computing device 702 may also be implemented as the mobile 718 class of device that includes mobile devices, such as a mobile phone, portable music player, portable gaming device, a tablet computer, a multi-screen computer, and so on. The computing device 702 may also be implemented as the television 720 class of device that includes devices having or connected to generally larger screens in casual viewing environments. These devices include televisions, set-top boxes, gaming consoles, and so on.

The techniques described herein may be supported by these various configurations of the computing device 702 and are not limited to the specific examples of the techniques described herein. This functionality may also be implemented all or in part through use of a distributed system, such as over a "cloud" 722 via a platform 724 as described below.

The cloud 722 includes and/or is representative of a platform 724 for resources 726. The platform 724 abstracts underlying functionality of hardware (e.g., servers) and software resources of the cloud 722. The resources 726 may include applications and/or data that can be utilized while computer processing is executed on servers that are remote from the computing device 702. Resources 726 can also include services provided over the Internet and/or through a subscriber network, such as a cellular or Wi-Fi network.

The platform 724 may abstract resources and functions to connect the computing device 702 with other computing devices. The platform 724 may also serve to abstract scaling of resources to provide a corresponding level of scale to encountered demand for the resources 726 that are implemented via the platform 724. Accordingly, in an interconnected device embodiment, implementation of functionality described herein may be distributed throughout the system 700. For example, the functionality may be implemented in part on the computing device 702 as well as via the platform 724 that abstracts the functionality of the cloud 722.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
receiving storage access requests from a virtual machine in a system in which the storage access requests are received by both a storage request processing module that updates one of multiple virtual disks as directed by each of the storage access requests and a replication management module that stores information associated with each storage access request in one of multiple logs; and maintaining, when switching the multiple logs, request ordering for write order dependent requests, the switching the multiple logs comprising:

switching the multiple logs in two parts, a first part of the two parts including initializing new logs and blocking processing of the information associated with each storage access request without blocking updating of the multiple virtual disks as directed by the storage access requests.

2. A method as recited in claim 1, each of the multiple virtual disks corresponding to one of the multiple logs.

3. A method as recited in claim 1, the request ordering comprising one storage access request not being issued until confirmation of another storage access request is received in accordance with a write-ahead-logging (WAL) protocol.

4. A method as recited in claim 1, the switching the multiple logs in two parts, the two parts including a second of the two parts including changing to the new logs and unblocking processing of new log queue entries.

5. A method as recited in claim 4, the first part including a first stage in which the new logs are initialized but processing of the information associated with each storage access request is not blocked, and a second stage in which processing of the information associated with each storage access request is blocked, the second stage being performed only after all the new logs are initialized.

6. A method as recited in claim 4, the second part including one stage in which the new logs are changed to and processing of new log queue entries is unblocked, and an additional stage in which switching of the multiple logs is finalized including flushing log queue entries in memory to storage, the processing of new log queue entries being unblocked only after all the new logs are changed to.

7. A method as recited in claim 1, the first part further including unblocking processing of new log queue entries in response to a handle of a service managing switching of the multiple log files being closed.

8. One or more computer storage media having stored thereon multiple instructions that, when executed by one or more processors of a system, cause the one or more processors to:

receive storage access requests from a virtual machine in the system in which the storage access requests are received by both a storage request processing module and a replication management module;

update, by the storage request processing module for each of the storage access requests, one of multiple virtual disks as directed by the storage access request;

buffer, by the replication management module, each of the storage access requests in parallel with the update performed by the storage request processing module;

store, by the replication management module for each of the buffered storage access requests, information associated with the storage access request in one of multiple logs;

switch the multiple logs and, while switching the multiple logs, blocking processing of the information associated with each storage access request without blocking updating of the multiple virtual disks as directed by the storage access requests, and maintaining request ordering for write order dependent requests; and transmit, for each of the storage access requests, a response to the virtual machine indicating a respective storage access request as complete when the storage request processing module has completed the update of the one of multiple virtual disks as directed by the respective storage access request and the replication management module has completed the storing of the information associated with the respective storage access request in the one of multiple logs.

9. One or more computer storage media as recited in claim 8, each of the multiple virtual disks corresponding to one of the multiple logs.

10. One or more computer storage media as recited in claim 8, the request ordering comprising one storage access request not being issued until confirmation of another storage access request is received in accordance with a write-ahead-logging (WAL) protocol.

11. One or more computer storage media as recited in claim 8, each of the storage access requests comprising a write request.

12. One or more computer storage media as recited in claim 8, the instructions causing the one or more processors to switch the multiple logs comprising instructions causing the one or more processors to perform switching of the multiple logs in two parts, a first of the two parts including initializing new logs and blocking processing of the information associated with each storage access request, and a second of the two parts including changing to the new logs and unblocking processing of new log queue entries.

13. One or more computer storage media as recited in claim 12, the first part including a first stage in which the new logs are initialized but processing of the information associated with each storage access request is not blocked, and a second stage in which processing of the information associated with each storage access request is blocked, the second stage being performed only after all the new logs are initialized.

14. One or more computer storage media as recited in claim 13, the second part including a third stage in which the new logs are changed to and processing of new log queue entries is unblocked, and a fourth stage in which switching of the multiple logs is finalized including flushing log queue entries in memory to storage, the processing of new log queue entries being unblocked only after all the new logs are changed to.

15. One or more computer storage media as recited in claim 14, the multiple instructions further causing the one or more processors to, in response to an identifier of a service managing switching of the log files being closed, unblock processing of new log queue entries prior to all the new logs being changed to.

16. A system comprising:
a storage request processing module configured to receive storage access requests from a virtual machine in the system in which the storage access requests are received by both the storage request processing module and a replication management module and update, for each of the storage access requests, one of multiple virtual disks as directed by the storage access request;
the replication management module configured to store, for each of the storage access requests, information associated with the storage access request in one of multiple logs, switch the multiple logs in multiple stages, maintain, during the switching, request ordering for write order dependent requests, and transmit, for each of the storage access requests, a response to the virtual machine indicating a respective storage access request as complete when the storage request processing module has completed the update of the one of multiple virtual disks as directed by the respective storage access request and the replication management module has completed the storing of the information associated with the respective storage access request in the one of multiple logs, and the multiple stages including:
a first stage in which new logs are initialized but processing of the information associated with each storage access request is not blocked,
a second stage in which processing of the information associated with each storage access request is blocked without blocking the update of the one of multiple virtual disks as directed by the storage access requests, the second stage being performed only after all the new logs are initialized,
a third stage in which the new logs are changed to and processing of new log queue entries is unblocked, the third stage being performed only after processing of the information associated with each storage access request is blocked, and
a fourth stage in which switching of the multiple logs is finalized including flushing log queue entries in memory to storage, the fourth stage being performed only after processing of the new log queue entries is unblocked.

17. A method as recited in claim 1, further comprising in response to an unexpected request during the switching the multiple logs, undoing changes made as part of the switching including:
deleting new logs that are created; and
preventing old logs from being switched.

18. A method as recited in claim 1, further comprising:
writing the multiple logs to an allocated amount of volatile memory effective to reduce input/output processing; and
writing the multiple logs to a storage device when the allocated amount of the volatile memory reaches a threshold.

19. One or more computer storage media as recited in claim 8, the multiple instructions further causing the one or more processors to:
write the multiple logs to an allocated amount of volatile memory effective to reduce input/output processing; and
write the multiple logs to a storage device when the allocated amount of the volatile memory reaches a threshold.

20. One or more computer storage media as recited in claim 8, the multiple instructions further causing the one or more processors to:
receive, while switching the multiple logs and during the blocking, additional storage access requests from the virtual machine; and
buffer, while switching the multiple logs and during the blocking, each of the additional storage access requests.

* * * * *